US011431863B2

(12) United States Patent
Ogawa (10) Patent No.: US 11,431,863 B2
(45) Date of Patent: Aug. 30, 2022

(54) IMAGE READING APPARATUS THAT READS IMAGE ON SOURCE DOCUMENT, AND IMAGE FORMING APPARATUS INCORPORATED WITH IMAGE READING APPARATUS

(71) Applicant: KYOCERA Document Solutions Inc., Osaka (JP)

(72) Inventor: Naozumi Ogawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/410,642

(22) Filed: Aug. 24, 2021

(65) Prior Publication Data

US 2022/0060594 A1    Feb. 24, 2022

(30) Foreign Application Priority Data

Aug. 24, 2020    (JP) .............................. JP2020-140778

(51) Int. Cl.
*H04N 1/04* (2006.01)
*H04N 1/00* (2006.01)

(52) U.S. Cl.
CPC ..... *H04N 1/00554* (2013.01); *H04N 1/00557* (2013.01); *H04N 1/00559* (2013.01)

(58) Field of Classification Search
CPC ........... H04N 1/00554; H04N 1/00557; H04N 1/00559
See application file for complete search history.

(56) References Cited

U.S. PATENT DOCUMENTS

2022/0053103 A1* 2/2022 Ando ................. H04N 1/00538

FOREIGN PATENT DOCUMENTS

JP    2017-156642 A    9/2017

\* cited by examiner

*Primary Examiner* — Cheukfan Lee
(74) *Attorney, Agent, or Firm* — IP Business Solutions, LLC (57) ABSTRACT

An image reading apparatus includes a scanner casing having a contact glass on an upper face, and located on an upper side of a main body frame of the image forming apparatus, a document retention member openably covering the upper face of the scanner casing, a hinge mechanism pivotably supporting the document retention member, a leg portion to an upper end portion of which the hinge mechanism is fixed, an insertion hole formed in the scanner casing, and having an opening oriented upward, in which the leg portion is inserted; and a reinforcing tube attached to an inner face of the insertion hole. The scanner casing includes a first housing, and a second housing mounted on an upper side of the first housing. The reinforcing tube is held between the first housing and the second housing in an up-down direction, and restricted from moving in the up-down direction.

7 Claims, 11 Drawing Sheets

IMAGE READING APPARATUS THAT READS IMAGE ON SOURCE DOCUMENT, AND IMAGE FORMING APPARATUS INCORPORATED WITH IMAGE READING APPARATUS

INCORPORATION BY REFERENCE

This application claims priority to Japanese Patent Application No. 2020-140778 filed on Aug. 24, 2020, the entire contents of which are incorporated by reference herein.

BACKGROUND

The present disclosure relates to an image reading apparatus that reads an image on a source document, and to an image forming apparatus incorporated with the image reading apparatus.

Many of existing image reading apparatuses, to be incorporated in an image forming apparatus such as a copier, include a scanner casing having a contact glass provided on the upper face thereof, on which a source document is placed, an image reading device located inside the scanner casing and configured to read the image on the source document on the contact glass, and a document retention member for retaining the source document placed on the contact glass.

A left and right pair of hinge mechanisms are attached to the rear end portion of the document retention member. The hinge mechanisms each include an immobile metal fitting, and a pivotal portion supported by the immobile metal fitting via a hinge shaft, so as to pivot with respect to the immobile metal fitting. The immobile metal fitting is fixed to the upper end portion of a leg portion extending in an up-down direction.

The leg portion is inserted in a reinforcing tube, erected on the upper face of the main body frame of the image forming apparatus. The reinforcing tube is located throughout a through hole formed in the scanner casing, in the up-down direction. The reinforcing tube located as above prevents the inner wall of the through hole in the scanner casing from being damaged, because of a direct contact with the leg portion. The reinforcing tube also serves as a positioning member for the scanner casing.

SUMMARY

The disclosure proposes further improvement of the foregoing techniques.

In an aspect, the disclosure provides an image reading apparatus including a scanner casing, a document retention member, a hinge mechanism, a leg portion, and a reinforcing tube. The scanner casing has a contact glass on an upper face, on which a source document is to be placed, and is located on an upper side of a main body frame of the image forming apparatus. The document retention member openably covers the upper face of the scanner casing. The hinge mechanism pivotably supports the document retention member. To an upper end portion of the leg portion, the hinge mechanism fixed. The through hole is formed in the scanner casing, and has an opening oriented upward, in which the leg portion is inserted. An insertion hole is formed in the scanner casing and the insertion hole has an opening oriented upward, in which the leg portion is inserted. The reinforcing tube is attached to an inner face of the insertion hole. The scanner casing includes a first housing having an opening oriented upward, and a second housing covering an upper portion of the first housing, and to which the contact glass is attached. The reinforcing tube is held between the first housing and the second housing in an up-down direction, and restricted from moving in the up-down direction.

In another aspect, the disclosure provides an image forming apparatus including an image forming device, and the foregoing image reading apparatus. The image forming device forms an image on a recording medium.

DETAILED DESCRIPTION

Hereafter, some embodiments of the disclosure will be described in detail, with reference to the drawings. However, the disclosure is not limited to the following embodiments.
[General Configuration]

Figure 1:
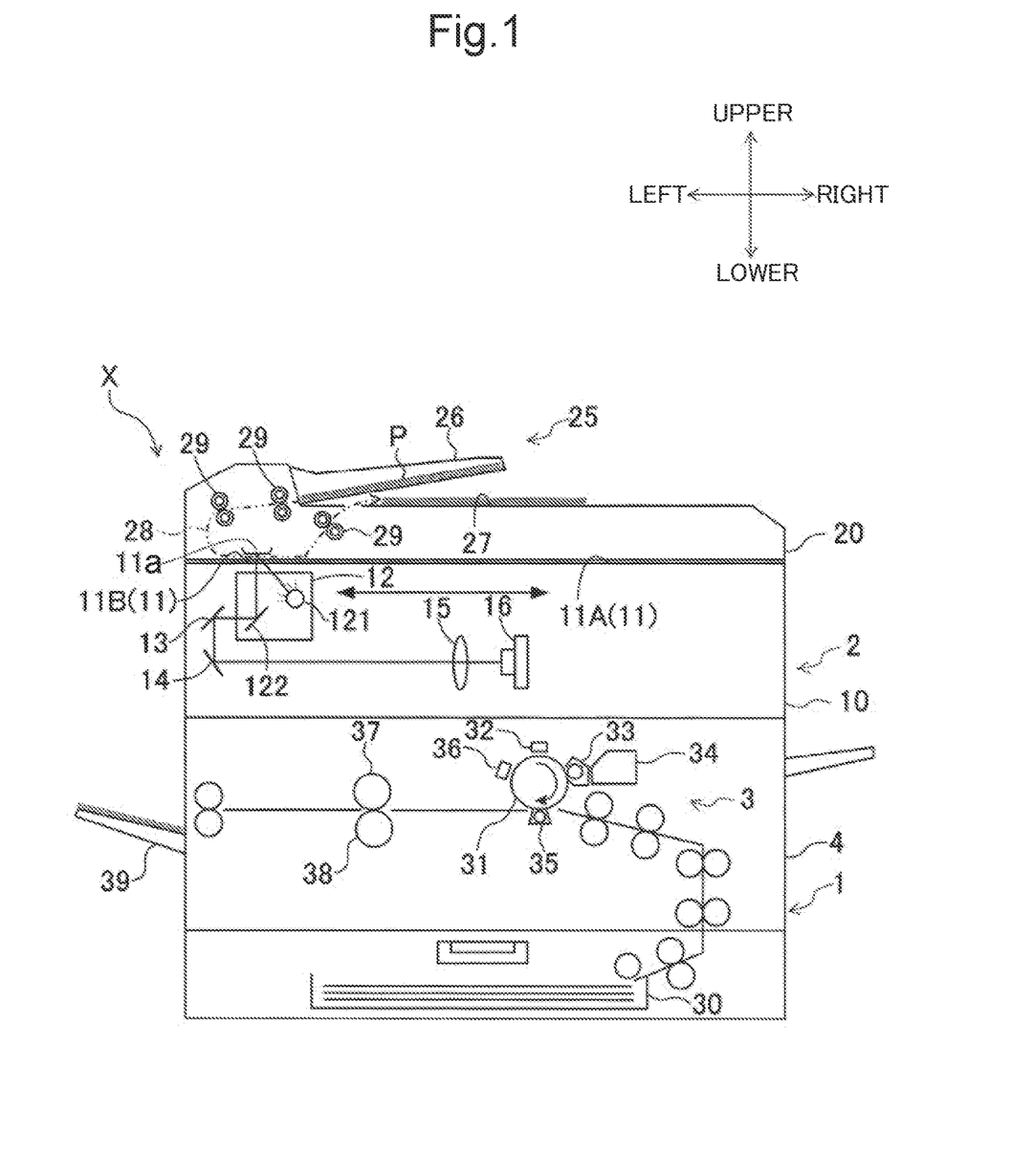
FIG. 1 is a schematic cross-sectional view showing an image forming apparatus, incorporated with an image reading apparatus according to an embodiment.

FIG. 1 illustrates an image forming apparatus X, incorporated with an image reading apparatus 2 according to an embodiment. In this embodiment, the image forming apparatus X is configured as a copier that prints image data of a source document P, read by the image reading apparatus 2.

More specifically, the image forming apparatus X includes an apparatus main body 1, and the image reading apparatus 2 fixed to the upper end face of the apparatus main body 1. In FIG. 1, the image reading apparatus 2 is illustrated in a larger size than the actual size in the height direction, for the sake of clarity. In the following description, unless otherwise specifically noted, the terms "front side" and "rear side" refer to the front side and the rear side of the image forming apparatus X (near side and far side along the direction perpendicular to the sheet of FIG. 1), and "left side" and "right side" refer to the left and right sides of the image forming apparatus X, viewed from the front side.

The apparatus main body 1 includes an image forming device 3, and a housing 4 accommodating the image forming device 3 therein. A paper cassette 30, for accommodating printing sheets, is removably mounted in the lower end portion of the housing 4.

The image forming device 3 includes a photoconductor drum 31, a charging device 32, a developing device 33, a toner container 34, a transfer roller 35, a charge neutralizer 36, a fixing roller 37, and a pressure roller 38. On a side face of the apparatus main body 1, an output tray 39 is mounted.

In the apparatus main body 1, an image is formed on the sheet supplied from the paper cassette 30, through the following process. First, the charging device 32 uniformly charges the photoconductor drum 31 to a predetermined potential.

Then a non-illustrated laser scanner unit (LSU) irradiates the surface of the photoconductor drum 31, with light representing the image data. As result, an electrostatic latent image is formed on the surface of the photoconductor drum 31. Then the developing device 33 develops the electrostatic latent image on the photoconductor drum 31, into a toner image.

The developing device 33 performs the developing operation, using the toner supplied from the toner container 34. The toner image formed on the photoconductor drum 31 is transferred to the sheet, by a transfer bias applied to the transfer roller 35. After the toner image is transferred, the charge neutralizer 36 eliminates the surface potential on the photoconductor drum 31.

The toner image transferred onto the sheet is heated and pressed while the sheet passes the fixing roller 37 and the pressure roller 38, thus to be fused and fixed to the sheet.

[Configuration of Main Body Frame of Image Forming Apparatus]

Figure 2:
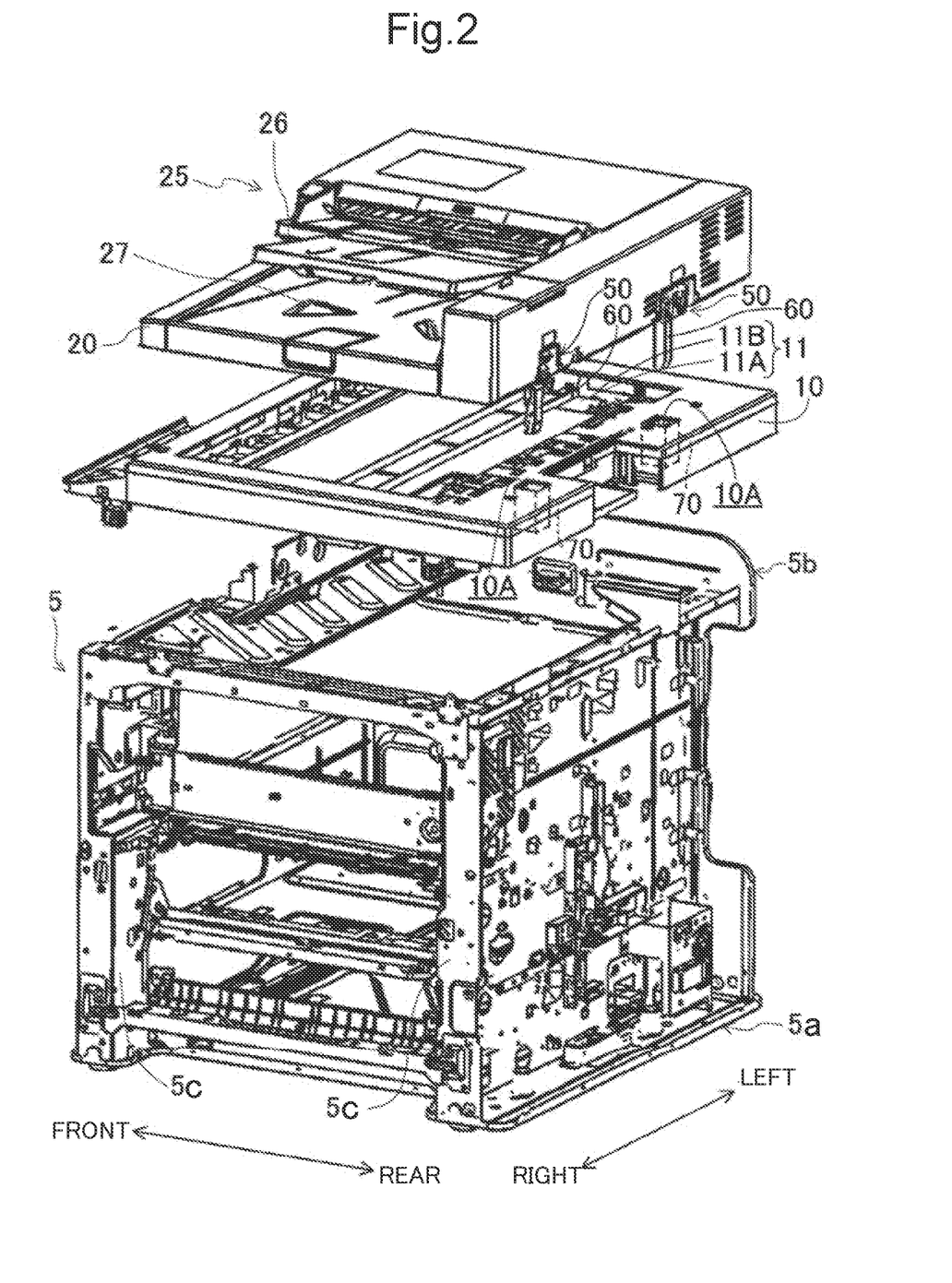
FIG. 2 is an exploded perspective view of the image forming apparatus.

As shown in FIG. 2, the housing 4 of the apparatus main body 1 includes a main body frame 5 made of a metal, and non-illustrated sheet metal covers respectively attached to the left and right side faces of the main body frame 5. The main body frame 5 includes a lower rectangular frame 5a and an upper rectangular frame 5b, spaced from each other in an up-down direction (vertical direction), and four pillar portions 5c (FIG. 2 shows only two of the pillar portions 5c) extending in the up-down direction so as to connect between the rectangular frames 5a and 5b. The image reading apparatus 2 is fixed to the upper face of the upper rectangular frame 5b.

[Configuration of Image Reading Apparatus]

Referring again to FIG. 1, the image reading apparatus 2 includes a scanner casing 10, a contact glass 11, a reading unit 12, mirrors 13 and 14, an optical lens 15, and a CCD sensor 16.

Figure 3:
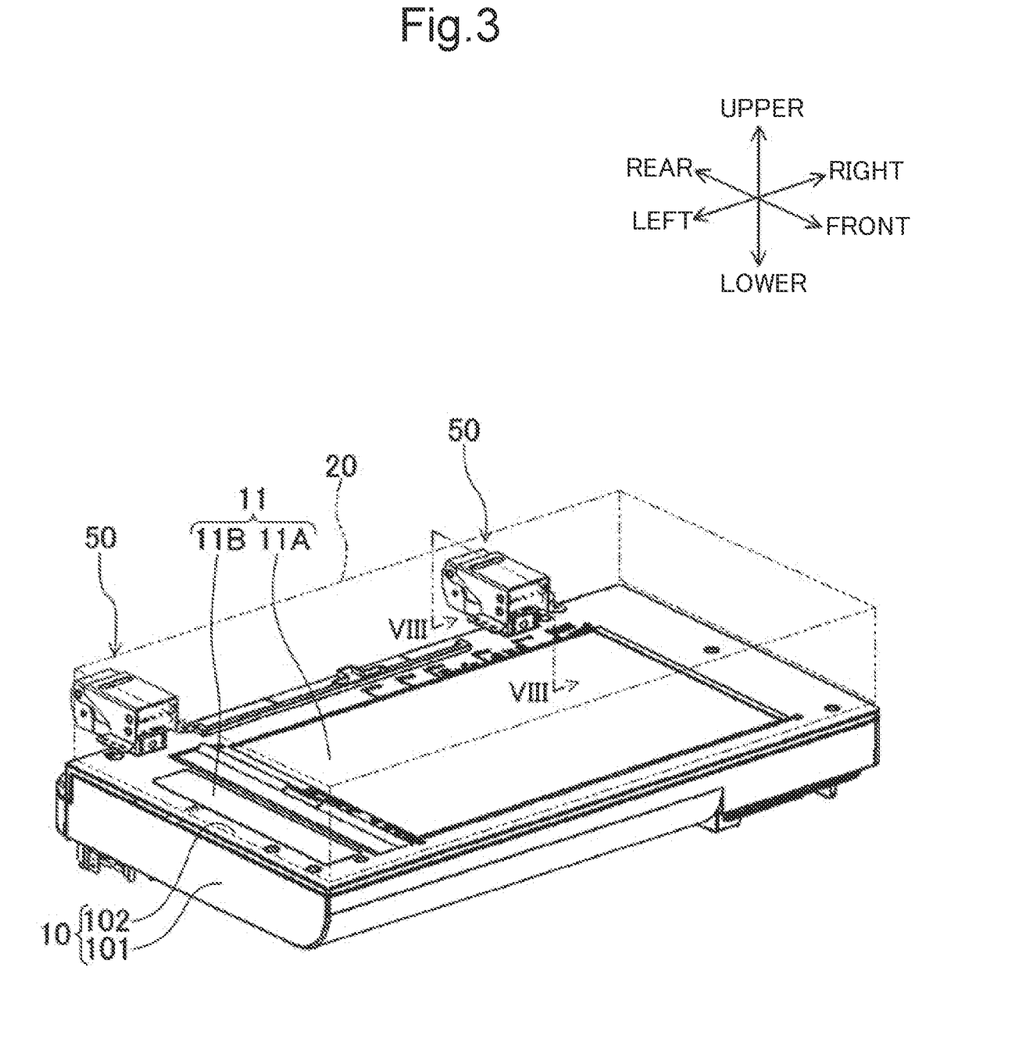
FIG. 3 is a perspective view showing a scanner casing of the image reading apparatus, and a pair of hinge mechanisms attached to the rear end portion of the scanner casing.

Referring to FIG. 3, the scanner casing 10 is formed in a box shape having a rectangular plan-view shape. The scanner casing 10 includes a pair of non-illustrated positioning pins provided on the lower face. The scanner casing 10 is positioned by respectively engaging the pair of positioning pins, with a pair of non-illustrated positioning holes formed don the upper face of the upper rectangular frame 5b of the main body frame 5. The scanner casing 10 is set in position by the pair of positioning pins, and fixed to the main body frame 5 with bolts or the like.

Figure 4:
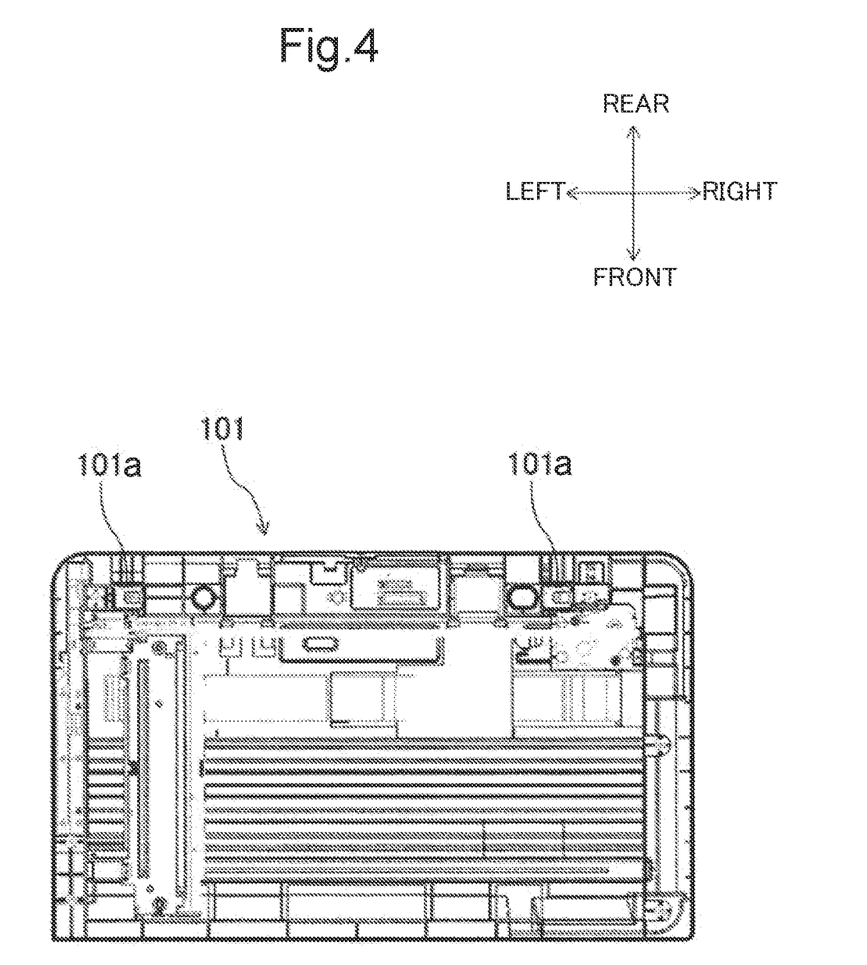
FIG. 4 is a plan view showing a lower housing of the scanner casing, seen from above.

The scanner casing 10 includes a lower housing 101 and an upper housing 102. The lower housing 101 corresponds to the first housing in the disclosure, and the upper housing 102 corresponds to the second housing in the disclosure. The lower housing 101 and the upper housing 102 are both molded from a resin material. As shown in FIG. 3 and FIG. 4, the lower housing 101 has a flat rectangular box shape, having an opening oriented upward. A pair of lower cylindrical walls 101a, to be subsequently described, are formed at the rear end portion of the lower housing 101.

Figure 5:
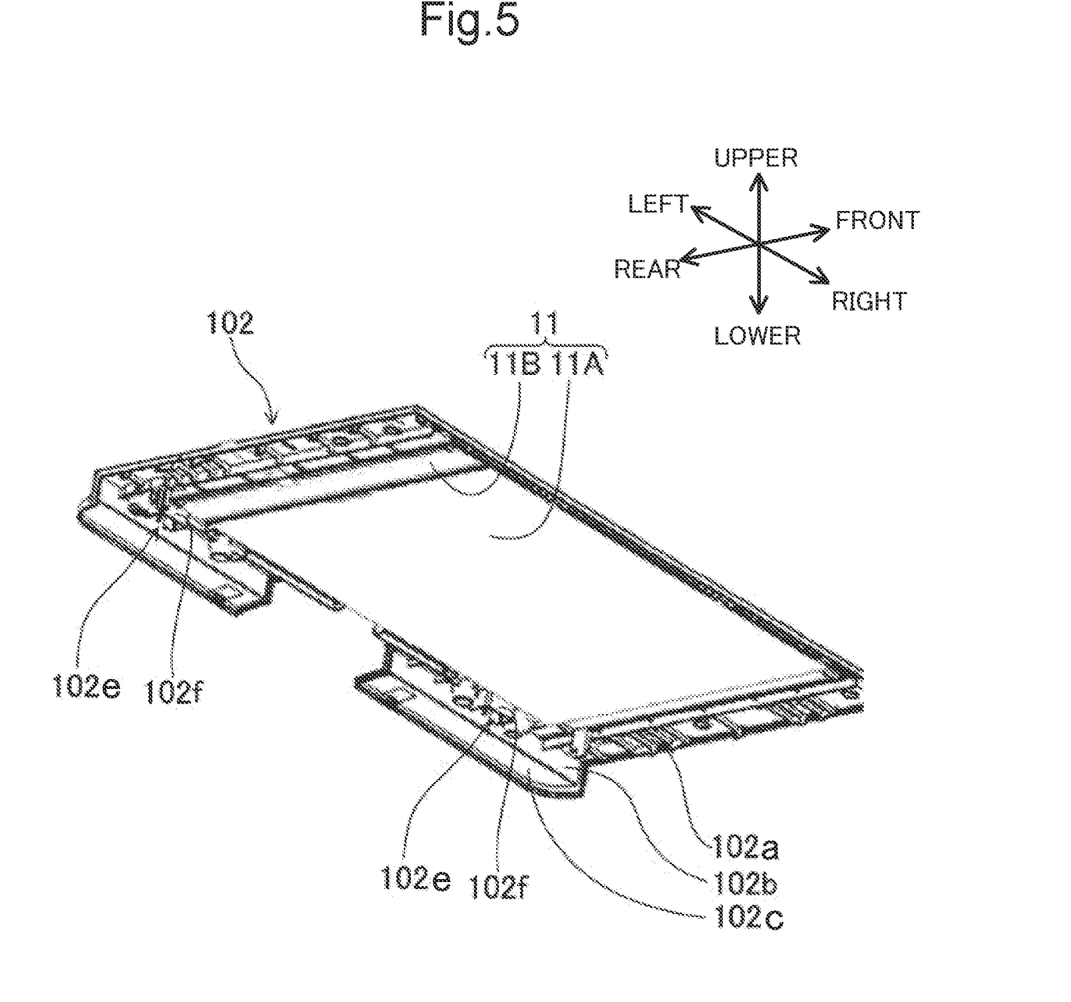
FIG. 5 is a perspective view showing an upper housing of the scanner casing, obliquely seen from a left lower position.

The upper housing 102 is mounted on the lower housing 101, from the upper side. To be more detailed, the upper housing 102 includes, as shown in FIG. 5, a rectangular plate-shaped portion 102a substantially covering the entirety of the upper face of the lower housing 101, a vertical plate-shaped portion 102b extending downward from the rear edge of the rectangular plate-shaped portion 102a, and a protruding plate-shaped portion 102c protruding to the rear side from the lower edge of the vertical plate-shaped portion 102b.

On the rectangular plate-shaped portion 102a, the contact glass 11 is attached. The contact glass 11 includes a first contact glass 11A used in a fixed document reading mode, and a second contact glass 11B used in a sheet-through reading mode. The first contact glass 11A occupies a major part of the rectangular plate-shaped portion 102a, except the left end portion. At the left end portion of the rectangular plate-shaped portion 102a, the second contact glass 11B is located.

As shown in FIG. 1, the reading unit 12 is accommodated inside the scanner casing 10. When reading the source document image in the fixed document reading mode, the reading unit 12 moves in a sub scanning direction (left-right direction in FIG. 1), while emitting light from an LED luminous source 121 to the source document P on the first contact glass 11A, and reflects the light reflected by the source document P in the horizontal direction, with a mirror 122. The mirrors 13 and 14 conduct the reflected light from the mirror 122 to the CCD sensor 16. The CCD sensor 16 photoelectrically converts the light incident thereto, to generate image data representing the source document image. The generated image data is stored in a non-illustrated data storage device. This is how the image reading apparatus 2 optically reads the image of the source document P placed on the first contact glass 11 (source document image), and generates the corresponding image data. Here, the CCD sensor 16 may be excluded, and instead a CIS sensor may be mounted in the reading unit 12.

[Document Cover and Automatic Document Feeder]

The upper face of the scanner casing 10 is openably covered with a document cover 20 (see FIG. 1), exemplifying the document retention member in the disclosure. On the upper side of the document cover 20, an automatic document feeder (ADF) 25 is mounted.

To read the source document image in the sheet-through reading mode, The ADF 25 passes the source document P over the upper face of the second contact glass 11B. To be more detailed, the ADF 25 includes a document feeding tray 26, a document discharge tray 27 located under the document feeding tray 26, and a U-shaped document transport route 28 formed between the document feeding tray 26 and the document discharge tray 27. The ADF 25 delivers the source documents P on the document feeding tray 26 one by one, using a plurality of transport roller pairs 29, to the downstream side along the document transport route 28, passes the source document P over a document reading position 11a defined on the second contact glass 11B, and discharges the source document P to the document discharge tray 27.

The reading unit 12 stays still at a standby position set right under the second contact glass 11B, when reading the source document image in the sheet-through reading mode. The reading unit 12 emits light from the LED luminous source 121 to the image of the document passing the document reading position 11a, and reflects the light reflected by the source document in the horizontal direction, using the mirror 122. The light reflected by the mirror 122 is reflected by the mirror 13 and the mirror 14, to be conducted to the CCD sensor 16. The CCD sensor 16 photoelectrically converts the light incident thereto, thereby generating the image data representing the source document image. The generated image data is stored in a non-illustrated data storage device.

Hereunder, a mounting structure of the document cover 20 onto the scanner casing 10 will be described. As shown in FIG. 2, the document cover 20 is mounted on the scanner casing 10, via a pair of hinge mechanisms 50 located with a spacing therebetween in the left-right direction. The left and right hinge mechanisms 50 have the same structure, and therefore only the hinge mechanism 50 on the right will be described hereunder.

Figure 6:
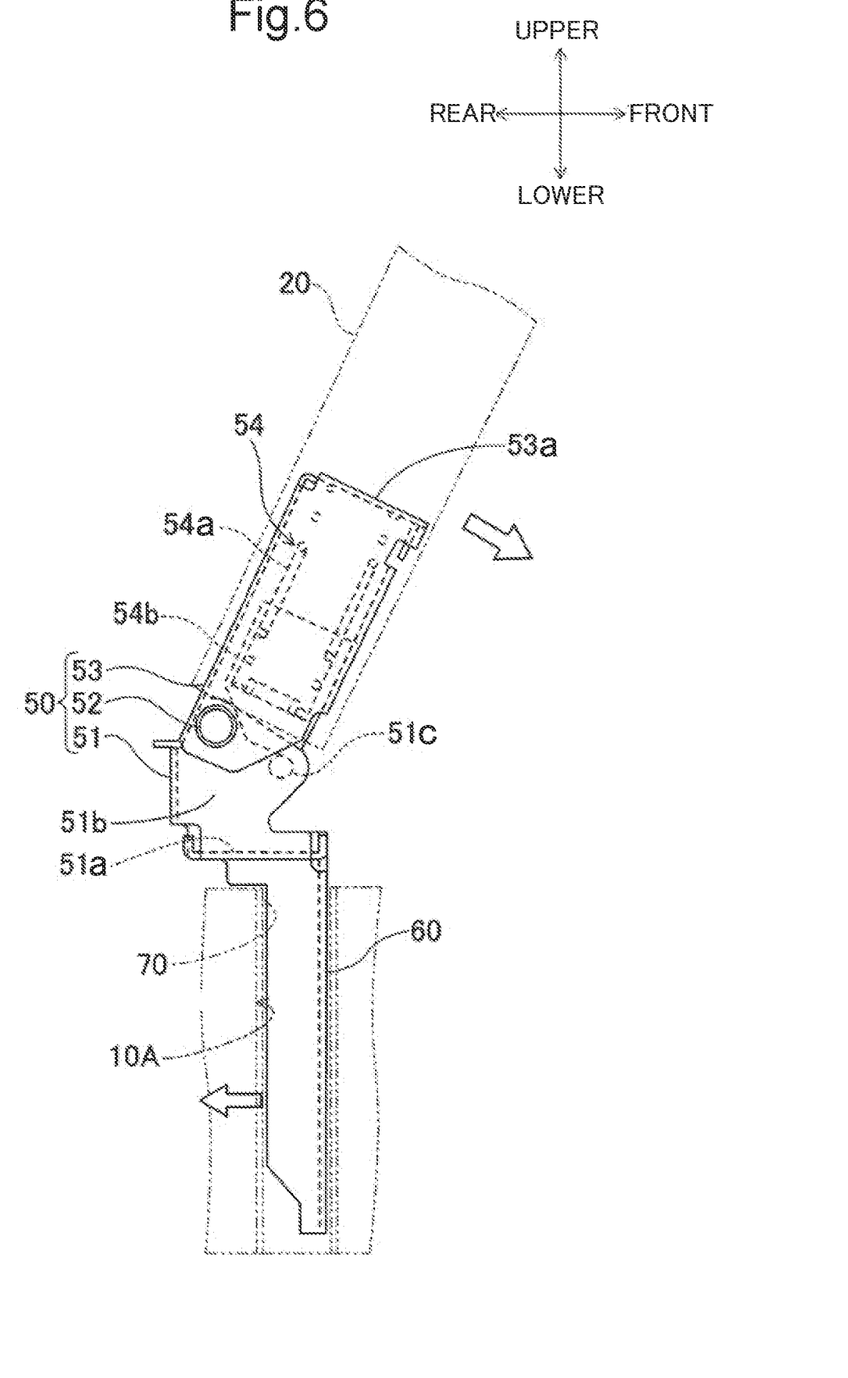
FIG. 6 is a side view showing the hinge mechanism, and a leg portion connected thereto.

As shown in FIG. 6, the hinge mechanism 50 includes an immobile portion 51, a hinge shaft 52 extending in the left-right direction, and a pivotal portion 53 pivotably connected to the immobile portion 51 via the hinge shaft 52. A leg portion 60 extending in the up-down direction is connected to the lower face of the immobile portion 51.

The immobile portion 51 includes a base plate 51*a*, and a pair of opposing plates 51*b* erected from the base plate 51*a*, so as to support the respective end portions of the hinge shaft 52. The pair of opposing plates 51*b* also support, in addition to the hinge shaft 52, the respective end portions of a fixed shaft 51*c* to be subsequently described.

The pivotal portion 53 is formed by bending a sheet metal material into a generally rectangular parallelepiped shape, and an end portion in the longitudinal direction is pivotably supported by the hinge shaft 52. The pivotal portion 53 is fixed to the rear end portion of the document cover 20, with a bolt or the like. The document cover 20 is made to pivot up and downward about the hinge shaft 52, together with the pivotal portion 53, so as to open or close the upper face of the contact glass 11.

Between an end plate 53*a* of the pivotal portion 53 and the fixed shaft 51*c* of the immobile portion 51, a retention mechanism 54 is provided, to retain the document cover 20 at a desired opening angle. The retention mechanism 54 includes a compression spring 54*a*, having one end abutted against the inner surface of the end plate 53*a*, and a retainer 54*b* engaged with the other end of the compression spring 54*a*, and abutted against the fixed shaft 51*c*. When the opening angle of the pivotal portion 53 exceeds a predetermined neutral angle, the retention mechanism 54 applies a biasing force to the pivotal portion 53 in the opening direction (counterclockwise in FIG. 6), so as to balance between the biasing force and the pivotal force originating from the self-weight of the document cover 20. Accordingly, the document cover 20 can be retained at a desired opening angle. On the other hand, when the opening angle of the pivotal portion 53 becomes equal to or narrower than the predetermined neutral angle, the retention mechanism 54 applies a biasing force to the pivotal portion 53 in the closing direction (clockwise in FIG. 6), to facilitate the document cover 20 to be fully closed.

The leg portion 60 is connected to the lower face of the immobile portion 51. The leg portion 60 is formed of a pillar-like member having a C-shaped cross-section, open to the rear side. Although the leg portion 60 and the immobile portion 51 are formed by bending a single metal plate in this embodiment, the leg portion 60 and the immobile portion 51 may be, for example, separately formed and connected with a bolt.

Figure 7:
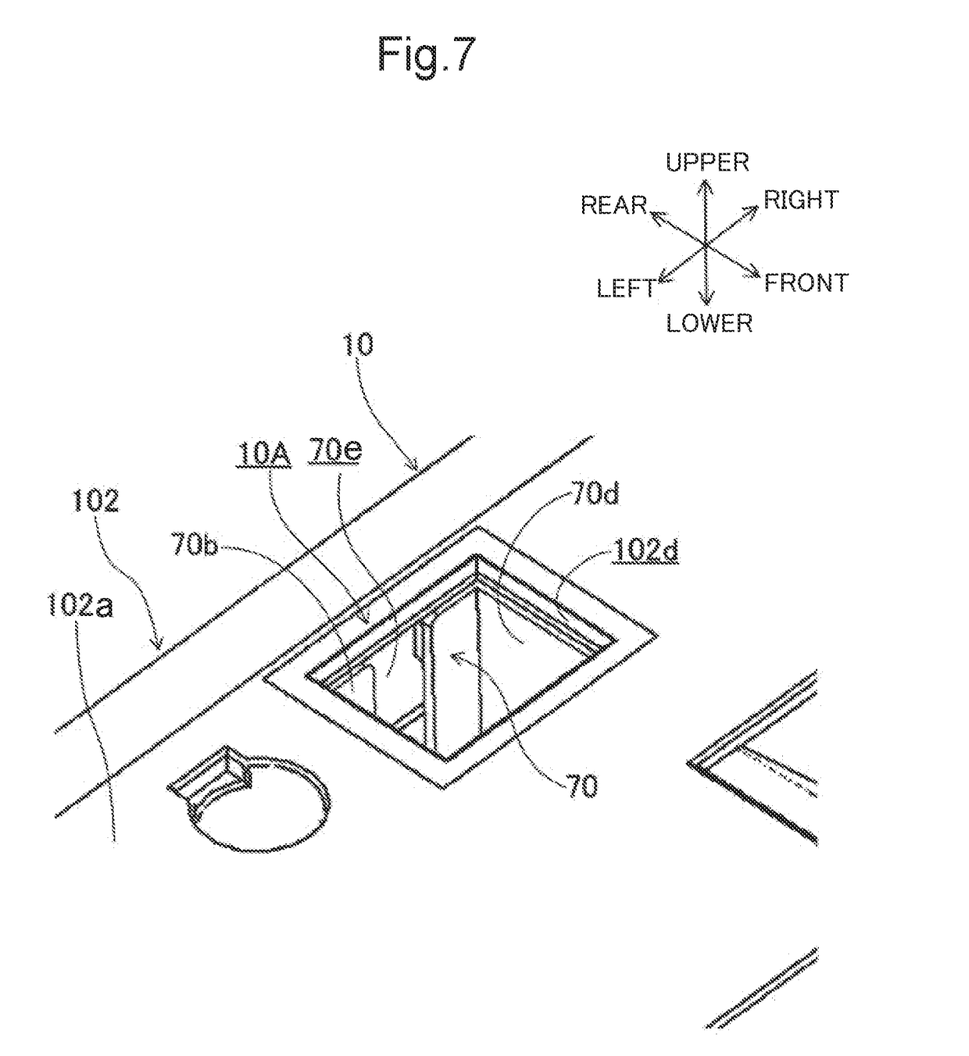
FIG. 7 is an enlarged perspective view showing an insertion hole formed in the upper housing of the scanner casing, through which the leg portion is to be inserted.

The leg portion 60 is, as shown in FIG. 7, inserted in an insertion hole 10A formed at the rear end portion of the scanner casing 10, with a reinforcing tube 70 interposed therebetween. A pair of insertion holes 10A are provided on the left and right sides, out of which only the left one is shown in FIG. 7. The leg portion 60 is slidable inside the insertion hole 10A, in the up-down direction. Accordingly, the user can lift up the document cover 20 together with the leg portion 60 with his/her hands, so as to slide the document cover 20 up and downward. Moving thus the document cover 20 up and downward allows adjustment of the position of the document cover 20 in the up-down direction, depending on the thickness of the source document P.

[Configuration of Insertion Hole]

Figure 8:
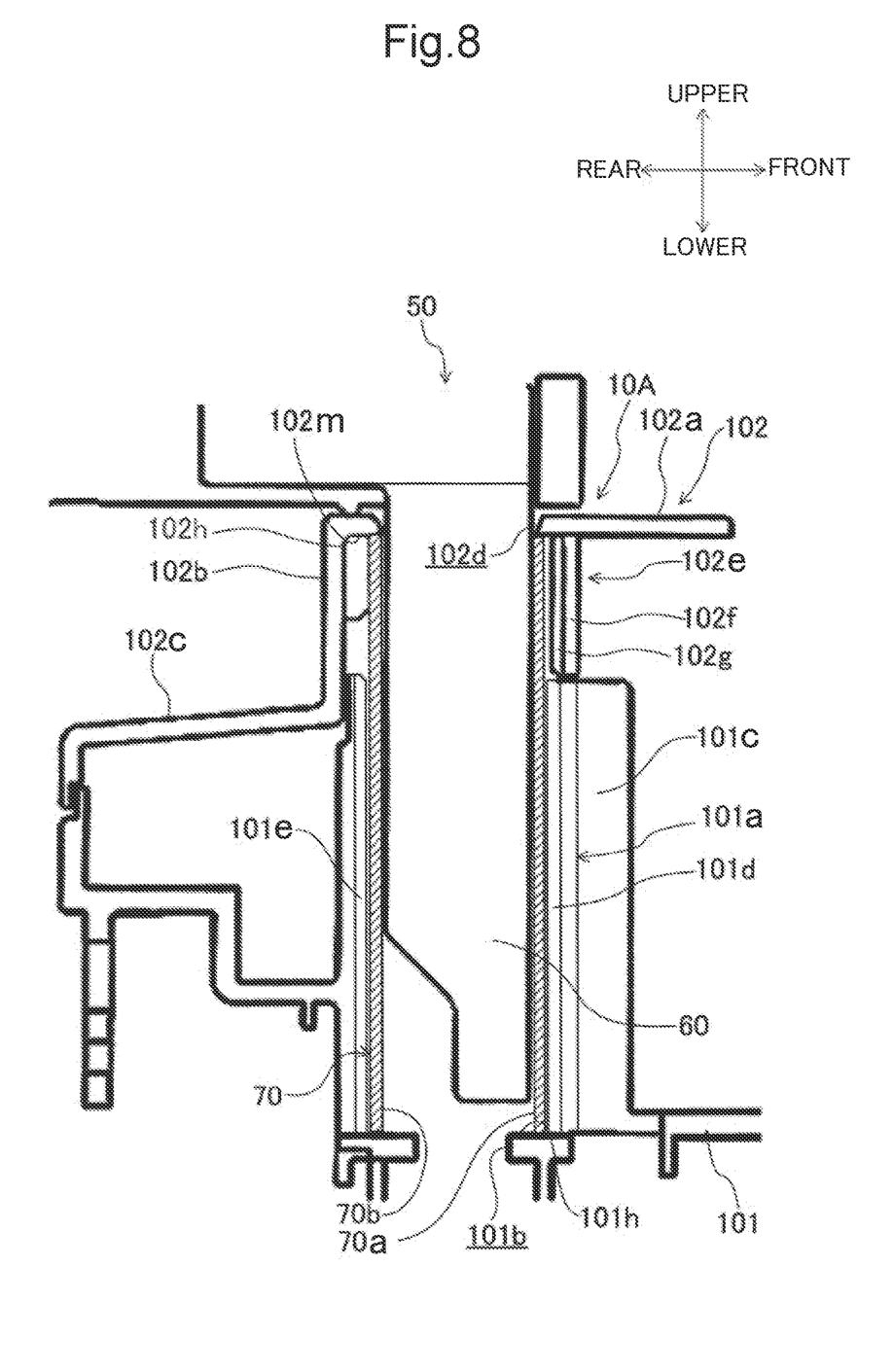
FIG. 8 is a cross-sectional view taken along a line VIII-VIII in FIG. 3.

As shown in FIG. 8, the insertion hole 10A includes an upper opening 102*d* of a rectangular shape, an upper cylindrical wall 102*e*, and a lower cylindrical wall 101*a*.

The upper opening 102*d* is, as also shown in FIG. 7, formed at the rear end portion of the rectangular plate-shaped portion 102*a* of the upper housing 102.

Figure 9:
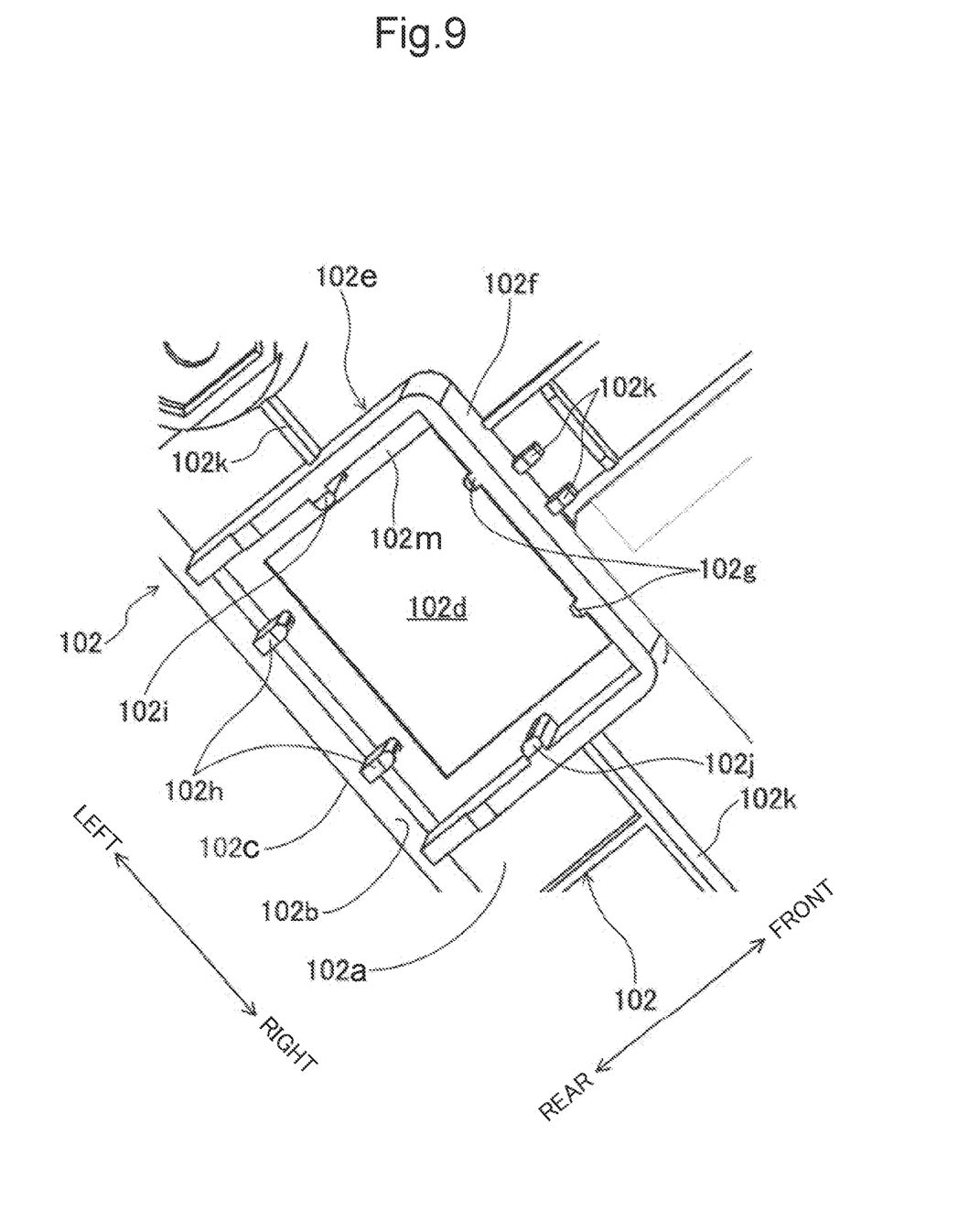
FIG. 9 is a perspective view showing an upper cylindrical wall formed in the upper housing of the scanner casing, and a peripheral region.

The upper cylindrical wall 102*e* is formed in a rectangular shape in a plan view, so as to surround the upper opening 102*d*, as shown in FIG. 8 and FIG. 9, and protrudes downward from the lower face of the rectangular plate-shaped portion 102*a* of the upper housing 102.

To be more detailed, the upper cylindrical wall 102*e* is constituted of a vertical plate-shaped portion 102*b* of the upper housing 102, and a C-shaped ribbed wall 102*f* (see FIG. 9) connected to the front side face of the vertical plate-shaped portion 102*b*. Along the inner surface of the upper cylindrical wall 102*e*, the upper end portion of the reinforcing tube 70 (see FIG. 8) is inserted.

As shown in FIG. 9, a left and right pair of front ridge portions 102*g*, a left and right pair of rear ridge portions 102*h*, a left ridge portion 102*i*, and a right ridge portion 102*j* are formed so as to protrude from the inner surface of the upper cylindrical wall 102*e*. The ridge portions 102*g* to 102*j* are each formed so as to extend along the entirety of the upper cylindrical wall 102*e* in the height direction (up-down direction). The respective end faces of the ridge portions 102*g* to 102*j* on the protruding side (inner side from the cylindrical wall) serve as delimiting faces for defining the position of the reinforcing tube 70. Further, the lower end portion of the end faces of the ridge portions 102*g* to 102*j* on the protruding side are chamfered, to facilitate the insertion of the reinforcing tube 70.

The outer face of the upper cylindrical wall 102*e* is connected to a plurality of vertical ribs 102*k* formed on the upper wall of the upper housing 102. Such a configuration enhances the rigidity of the upper cylindrical wall 102*e* in the in-out direction (thickness direction).

A portion of the rectangular plate-shaped portion 102*a* on the inner side of the upper housing 102 constitutes a flat surface 102*m* of a rectangular frame shape, surrounding the upper opening 102*d*. The flat surface 102*m* is formed so as to oppose the upper end face of the reinforcing tube 70. The flat surface 102*m* serves to restrict the reinforcing tube 70 from moving upward (see FIG. 8). Although it is preferable that the flat surface 102*m* is located in contact with the upper end face of the reinforcing tube 70, the flat surface 102*m* and the upper end face of the reinforcing tube 70 may be located with a gap therebetween.

Figure 10:
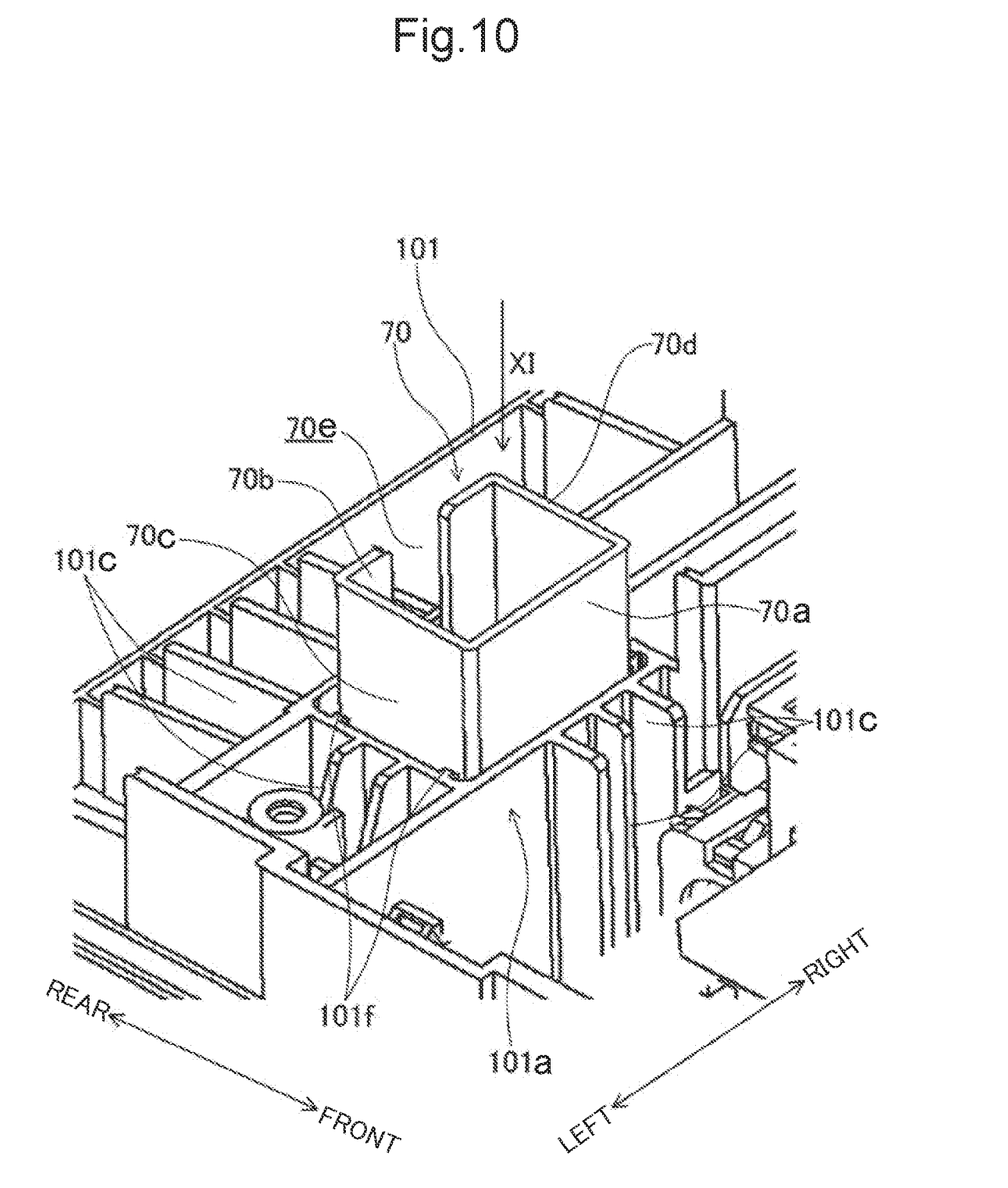
FIG. 10 is a perspective view showing a lower cylindrical wall formed in the lower housing of the scanner casing, and a reinforcing tube inserted inside the lower cylindrical wall.

As shown in FIG. 8 and FIG. 10, the lower cylindrical wall 101*a* has a rectangular shape in a plan view, and is erected upward from the bottom wall of the lower housing 101. To the inside of the lower cylindrical wall 101*a*, the section of the reinforcing tube 70 from the lower end portion to the intermediate portion (on the lower side of the upper end portion) is inserted.

Figure 11:
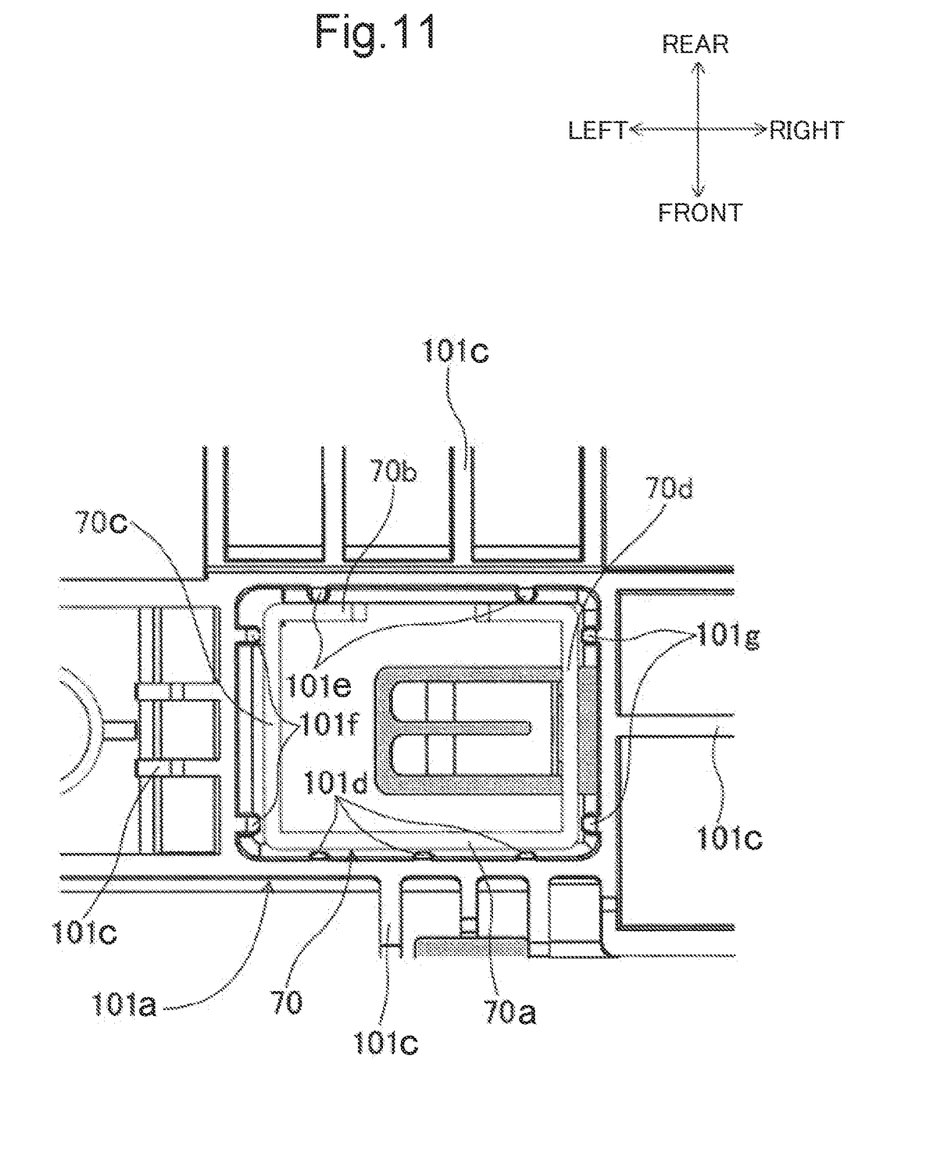
FIG. 11 is a plan view of the portion shown in FIG. 10, seen along the direction of an arrow XI in FIG. 10.

As shown in FIG. 11, three front ridge portions 101d aligned in the left-right direction at regular intervals, a left and right pair of rear ridge portions 101e, a left and right pair of left ridge portions 101f, and a left and right pair of right ridge portions 101g are formed so as to protrude from the inner surface of the lower cylindrical wall 101a. The ridge portions 101d to 101g are each formed so as to extend along the entirety of the lower cylindrical wall 101a in the height direction (up-down direction). The respective end faces of the ridge portions 101d to 101g on the protruding side (inner side from the cylindrical wall) serve as delimiting faces for defining the position of the reinforcing tube 70. Further, the lower end portion of the end faces of the ridge portions 101d to 101g on the protruding side are chamfered, to facilitate the insertion of the reinforcing tube 70.

The outer face of the lower cylindrical wall 101a is connected to a plurality of vertical ribs 101c formed on the bottom wall of the lower housing 101. Such a configuration enhances the rigidity of the lower cylindrical wall 101a in the in-out direction (thickness direction).

As shown in FIG. 8, an opening 101b of a rectangular shape, and a flat surface 101h of a rectangular frame shape surrounding the opening 101b, are provided in an inner region of the lower cylindrical wall 101a, at the position corresponding to the bottom wall of the lower housing 101.

The flat surface 101h is opposed the lower end face of the reinforcing tube 70, to restrict the reinforcing tube 70 from moving downward (see FIG. 8). Although it is preferable that the is located in contact with the lower end face of the reinforcing tube 70, the flat surface 101h and the lower end face of the reinforcing tube 70 may be located with a gap therebetween.

Further, although it is not mandatory to form the opening 101b, forming the opening 101b as in this embodiment facilitates air to be discharged therethrough, when the leg portion 60 is inserted, thus reducing the insertion resistance of the leg portion 60.

[Configuration of Reinforcing Tube 70]

The configuration of the reinforcing tube 70 will now be described, with reference to FIG. 8 and FIG. 10. The reinforcing tube 70 is attached to the inner wall of the insertion hole 10A. The reinforcing tube 70 serves to prevent the inner wall of the insertion hole 10A from being damaged by being pressed by the leg portion 60, when the document cover 20 is opened or closed.

To be more detailed, when the document cover 20 is inclined as indicated by dash-dot-dot lines in FIG. 6, during the opening or closing action, the leg portion 60 is urged to tilt forward, together with the document cover 20. As result, the inner wall of the insertion hole 10A (in particular, inner wall on the rear side) may be damaged, by being pressed by the leg portion 60.

In this embodiment, in contrast, the reinforcing tube 70 is attached to the inner wall of the insertion hole 10A. The reinforcing tube 70 is, for example, formed by bending a sheet metal material such as iron or aluminum. More specifically, the reinforcing tube 70 is, as shown in FIG. 10, formed in a rectangular cylindrical shape including a front wall 70a, a rear wall 70b, a left wall 70c, and a right wall 70d. In addition, a gap 70e of a belt-like shape is formed throughout the rear wall 70b of the reinforcing tube 70 in the up-down direction, at the central portion of the rear wall 70b in the left-right direction.

To attach the reinforcing tube 70 to the insertion hole 10A, first the reinforcing tube 70 is inserted in the lower cylindrical wall 101a of the lower housing 101, as shown in FIG. 10. Then the upper housing 102 is attached to the lower housing 101, such that the upper cylindrical wall 102e (see FIG. 9) of the upper housing 102 is fitted to the upper end portion of the reinforcing tube 70. As a result, the reinforcing tube 70 is held between the flat surface 102m of the upper housing 102 and the flat surface 101h of the lower housing 101 as shown in FIG. 8, thus to be restricted from moving in the up-down direction. In other words, the flat surface 101h of the lower housing 101 supports the lower end portion of the reinforcing tube 70 attached to the inner wall of the insertion hole 10A, and the flat surface 102m of the upper housing 102 is engaged with the upper end portion of the reinforcing tube 70 attached to the inner wall of the insertion hole 10A, so as to restrict the reinforcing tube 70 from moving in the horizontal direction.

Upon assembling the lower housing 101, the upper housing 102, and the reinforcing tube 70 with each other as above, the assembly of the scanner casing 10 is completed. The operator mounts the scanner casing 10 built up as above on the upper face of the upper rectangular frame 5b of the main body frame 5 (see FIG. 2). In this process, the non-illustrated positioning pins, protruding from the lower face of the scanner casing 10, are fitted in the positioning holes formed on the upper face of the main body frame 5, to set the scanner casing 10 in position, and then the scanner casing 10 is fixed to the main body frame 5 with bolts. After the scanner casing 10 is fixed, the leg portions 60 (see FIG. 6 and FIG. 8) respectively fixed to the left and right hinge mechanisms 50 of the document cover 20 are inserted in the pair of insertion holes 10A, provided at the rear end portion of the scanner casing 10. Throughout the mentioned process, the mounting of the document cover 20 on the scanner casing 10 is completed.

Advantageous Effects of Embodiment

As described thus far, the scanner casing 10 in the image reading apparatus 2 according to this embodiment includes the lower housing 101 open upward, and the upper housing 102 covering the upper side of the lower housing 101, and to which the first contact glass 11A is attached. The scanner casing 10 includes the insertion hole 10A, in which the leg portion 60 connected to the hinge mechanism 50 is inserted, and the reinforcing tube 70 is attached to the inner wall of the insertion hole 10A. The reinforcing tube 70 is held between the lower housing 101 and the upper housing 102 in the up-down direction, thus to be restricted from moving in the up-down direction.

With the configuration described above, the scanner casing 10 can be mounted on the main body frame 5, with the reinforcing tube 70 attached in advance to the insertion hole 10A of the scanner casing 10. Therefore, the scanner casing 10 can be mounted on the main body frame 5 more easily, compared with the conventional method of erecting the reinforcing tube on the upper face of the main body frame 5, and fitting the through hole formed in the scanner casing 10 to the outer face of the reinforcing tube.

The mentioned configuration eliminates the need to employ a bolt or an adhesive, to fix the reinforcing tube 70 to the scanner casing 10, thereby contributing to simplifying the structure for fixing the reinforcing tube 70 to the scanner casing 10. In addition, since the reinforcing tube 70 is held between the lower housing 101 and the upper housing 102 from the upper and lower sides, thus to be restricted from moving in the up-down direction, the reinforcing tube 70 can be prevented from being positionally shifted, by being dragged by the leg portion 60 when the document cover 20 is moved up or downward.

In the foregoing embodiment, the lower housing 101 and the upper housing 102 respectively includes the lower cylindrical wall 101a and the upper cylindrical wall 102e, each fitted on the outer face of the reinforcing tube 70 so as to restrict the reinforcing tube 70 from moving in the horizontal direction.

In other words, the reinforcing tube 70 is set in position in the horizontal direction, because of the upper cylindrical wall 102e and the lower cylindrical wall 101a being fitted on the outer face of the reinforcing tube 70. Therefore, the reinforcing tube 70 can be prevented from being positionally shifted, in the horizontal direction.

In the foregoing embodiment, the cylindrical walls 101a and 102e respectively include the ridge portions 101d to 101g and the ridge portions 102g to 102j, formed on the inner surface so as to extend in the up-down direction, to restrict the reinforcing tube 70 from moving in the horizontal direction.

The mentioned configuration allows the reinforcing tube 70 to be positioned in the horizontal direction with high accuracy, by improving the formation accuracy of the ridge portions 101d to 101g and the ridge portions 102g to 102j, even when the profile irregularity of the inner surface of the cylindrical walls 101a and 102e is unsatisfactory. Accordingly, it is unnecessary to improve the profile irregularity of the inner surface of the cylindrical walls 101a and 102e as a whole, which leads to reduced molding cost of the housings 101 and 102.

In the foregoing embodiment, the reinforcing tube 70 includes the gap 70e formed so as to extend all the way in the up-down direction.

Accordingly, when a pressing force is exerted on the reinforcing tube 70 from the leg portion 60, the reinforcing tube 70 is slightly deformed so as to expand toward the both sides of the gap 70e. As result, the pressing force exerted on the reinforcing tube 70 from the leg portion 60 can be released, and the reinforcing tube 70 can be prevented from being damaged.

The pressing force exerted on the reinforcing tube 70 from the leg portion 60 is generated, as mentioned above, when the document cover 20 is urged to tilt forward, owing to the self-weight, together with the leg portion 60. Accordingly, a large pressing force is exerted on the rear wall 70b of the reinforcing tube 70, as indicated by a white arrow in FIG. 6.

In the foregoing embodiment, therefore, the gap 70e is formed in the rear wall 70b of the reinforcing tube 70. Forming thus the gap 70e in the reinforcing tube 70, at the position where the pressing force of the leg portion 60 becomes largest, facilitates the reinforcing tube 70 to be deformed when the pressing force is exerted thereon, thereby further assuring that the reinforcing tube 70 is prevented from being damaged.

Here, it is also possible to set the scanner casing in position with respect to the main body frame, using positioning pins together with the reinforcing tube. In this case, the reinforcing tube erected on the main body frame is inserted in the through hole of the scanner casing with a gap therebetween, so as not to obstruct the positioning function of the positioning pins.

With the mentioned structure, however, the through hole of the scanning casing has to be fitted on the reinforcing tube erected on the main body frame, in addition to setting the scanner casing in position with respect to the main body frame using the positioning pins. Therefore, the assembly efficiency is lowered.

According to the foregoing embodiment, in contrast, since the image reading apparatus 2 includes the hinge mechanism 50, the leg portion 60, the insertion hole 10A, and the reinforcing tube 70 configured as above, the assembly efficiency of the scanner casing 10 to the main body frame 5 of the image forming apparatus X can be improved.

Other Embodiments

Although the ADF 25 is mounted on the upper face of the document cover 20 in the foregoing embodiment, the ADF 25 may be excluded.

Although the reinforcing tube 70 is formed in a rectangular cylindrical shape in the foregoing embodiment, the reinforcing tube 70 may be formed in any desired shape, for example a circular cylindrical shape.

Although the reinforcing tube 70 includes the gap 70e in the foregoing embodiment, the reinforcing tube 70 may be formed in a closed loop shape, instead of forming the gap 70e.

Although the image forming apparatus X is exemplified by the copier in the foregoing embodiments, the image forming apparatus X is not limited thereto. The image forming apparatus X may be configured, for example, as a printer, a facsimile machine, or a multifunction peripheral (MFP).

INDUSTRIAL APPLICABILITY

As described thus far, the disclosure is advantageously applicable to an image reading apparatus, and to an image forming apparatus incorporated with the image reading apparatus.

While the present disclosure has been described in detail with reference to the embodiments thereof, it would be apparent to those skilled in the art the various changes and modifications may be made therein within the scope defined by the appended claims.

What is claimed is:
1. An image reading apparatus comprising:
a scanner casing having a contact glass on an upper face, on which a source document is to be placed, and located on an upper side of a main body frame of the image forming apparatus;
a document retention member openably covering the upper face of the scanner casing;
a hinge mechanism pivotably supporting the document retention member; and
a leg portion to an upper end portion of which the hinge mechanism is fixed;
wherein an insertion hole is formed in the scanner casing and the insertion hole has an opening oriented upward, in which the leg portion is inserted;
wherein the image reading apparatus further comprising a reinforcing tube attached to an inner face of an insertion hole,
wherein the scanner casing includes a first housing having an opening oriented upward, and a second housing covering an upper portion of the first housing, and on which the contact glass is attached, and
the reinforcing tube is held between the first housing and the second housing in an up-down direction, and restricted from moving in the up-down direction.

2. The image reading apparatus according to claim 1,
wherein the first housing and the second housing are each fitted on an outer face of the reinforcing tube, thereby restricting the reinforcing tube from moving in a horizontal direction, and each include a cylindrical wall constituting a wall face of the insertion hole.

3. The image reading apparatus according to claim 2,
wherein the cylindrical walls respectively formed in the first housing and the second housing each include a ridge portion formed on an inner surface so as to extend in the up-down direction, the ridge portion being configured to restrict the reinforcing tube from moving in the horizontal direction.

4. The image reading apparatus according to claim 3,
wherein the ridge portion of the first housing supports a lower end portion of the reinforcing tube attached to an inner wall of the insertion hole, and the ridge portion of the second housing is engaged with an upper end portion of the reinforcing tube attached to the inner wall of the insertion hole, the ridge portions being configured to restrict the reinforcing tube from moving in the horizontal direction.

5. The image reading apparatus according to claim 1,
wherein a gap extending over an entirety of the reinforcing tube in the up-down direction is formed in the reinforcing tube.

6. The image reading apparatus according to claim 5,
wherein the insertion hole in which the leg portion is inserted is located on a rear side of the apparatus with respect to the contact glass, in a front-back direction orthogonal to a hinge shaft of the hinge mechanism, and the gap is formed in a wall of the reinforcing tube on the rear side of the apparatus.

7. An image forming apparatus comprising:

an image forming device that forms an image on a recording medium; and the image reading apparatus according to claim 1.

\* \* \* \* \*